United States Patent [19]
Yard et al.

[11] Patent Number: 5,896,393
[45] Date of Patent: Apr. 20, 1999

[54] SIMPLIFIED FILE MANAGEMENT SCHEME FOR FLASH MEMORY

[75] Inventors: Christopher J. Yard; Mark Ireton, both of Austin, Tex.

[73] Assignee: Advanced Micro Devices, Inc., Sunnyvale, Calif.

[21] Appl. No.: 08/651,261

[22] Filed: May 23, 1996

[51] Int. Cl.$^6$ .................................................. G06F 11/00
[52] U.S. Cl. .................... 371/10.2; 711/103; 711/114; 365/185.09; 365/185.33; 365/200; 371/10.3; 395/182.05
[58] Field of Search .................. 371/10.2; 365/185.11, 365/185.09, 185.01, 185.25, 218, 200; 707/202; 395/430, 182.05, 723, 182.06; 711/103

[56] References Cited

U.S. PATENT DOCUMENTS

| | | | |
|---|---|---|---|
| 5,268,870 | 12/1993 | Harari | 711/103 |
| 5,297,096 | 3/1994 | Terada et al. | 365/185.11 |
| 5,297,148 | 3/1994 | Harari et al. | 371/10.2 |
| 5,329,488 | 7/1994 | Hashimoto | 365/185.09 |
| 5,337,275 | 8/1994 | Garner | 365/189.01 |
| 5,347,486 | 9/1994 | Urai | 365/185.25 |
| 5,357,475 | 10/1994 | Hasbun et al. | 395/430 |
| 5,404,485 | 4/1995 | Ban | 711/202 |
| 5,405,069 | 4/1995 | Duncan et al. | 226/25 |
| 5,418,752 | 5/1995 | Harari et al. | 365/218 |
| 5,535,328 | 7/1996 | Harari et al. | 395/182.05 |
| 5,537,588 | 7/1996 | Engelmann et al. | 707/202 |
| 5,581,723 | 12/1996 | Hasbun et al. | 395/723 |
| 5,602,987 | 2/1997 | Harari et al. | 395/182.06 |
| 5,671,229 | 9/1997 | Harari et al. | 365/200 |

FOREIGN PATENT DOCUMENTS

L039 561  8/1966  United Kingdom .

OTHER PUBLICATIONS

PCI Local Bus—*PCI Multimedia Design Guide*—Revision 1.0—Mar. 29, 1994, 43 pages.

*Primary Examiner*—Tod R. Swann
*Assistant Examiner*—Fred F. Tzeng
*Attorney, Agent, or Firm*—Conley, Rose & Tayon; Kevin L. Daffer; Robert C. Kowert

[57] ABSTRACT

A method of managing a memory array having a plurality of erasable sectors. The method initially assigns at least one of the erasable sectors as a storage array and at least one of the erasable sectors as an update array. At least one data file is then sequentially written into the storage array beginning at a starting byte within the storage array. Each data file written into the storage array is initially designated as an active file. Thereafter, one or more of the active files is deleted by re-designating an active file as a deleted file. The deletion of active files is accomplished without erasing any of the erasable sectors. In a presently preferred embodiment, the deletion of files is accomplished by setting an Active/Delete flag in a header of the file. After deleting one or more active files, the array comprises at least one active file and at least one deleted file. Thereafter, the array is periodically updated by copying the active files from the storage array to the update array and erasing the sectors that comprise the storage array.

13 Claims, 15 Drawing Sheets

File Delete Procedure

SIMPLIFIED FILE MANAGEMENT SCHEME FOR FLASH MEMORY

BACKGROUND OF THE INVENTION

1. Field of the Invention

This invention relates to the field of semiconductor memory controllers and more particularly to a simplified method of managing electrically erasable programmable read only memory (EEPROM) and flash memory devices.

2. Description of the Relevant Art

Semiconductor memories can be generally categorized as either volatile or non-volatile. Volatile memories such as static and dynamic random access memories (RAMs) are characterized by fast cycle times for both read and write operations, random access for both read and write operations, and, in the case of dynamic RAMs, high density. For these reasons, volatile memories are highly desirable in many applications. As their name implies however, volatile memories are susceptible to power loss. RAMs retain their stored data only as long a constant DC voltage is maintained at the power supply pin of the device. On the other hand, non-volatile memories such as ROMs, PROMs, EPROMs, EEPROMs, and flash memories are immune to power failure; retaining their stored data whether power is applied or not.

The memory cell of a typical EEPROM or flash memory device is the floating gate transistor. The floating gate transistor has source and drain regions similar to a conventional MOS transistor, but the polysilicon (poly) gate is electrically unconnected to other circuitry within the device. This "floating" gate is formed over a thin oxide, which is usually less than 100 angstroms thick. The threshold voltage of the floating gate transistor is manipulated by controlling the quantity of electrons that reside on the floating gate. The source and drain regions of the floating gate cell are coupled and uncoupled through the use a control gate. The control gate can alternatively be fashioned as a second poly gate, formed over the floating gate and separated from the floating gate by a dielectric, or as a contact to the device channel. If a sufficient number of electrons are deposited on the floating gate, the control gate will be unable to turn on the transistor (i.e. the threshold voltage will exceed the operating voltage of the circuit). If the electrons deposited on the floating gate are subsequently removed, applying a voltage in the range of 2.4 to 6 Volts to the control gate will form a channel between the source and drain regions.

Typically, electrons are deposited on the floating gate of EEPROM and flash memory devices during a programming operation. During programming, the control gate and the drain are raised to highly positive values with respect to the source. The positive voltages on the gate and drain generate hot electrons in the channel near the drain. The hot electrons are injected onto the floating gate where they are trapped. To subsequently remove the trapped electrons from the floating gate, a relatively high voltage is applied to the source while the gate is grounded. The floating gate electrons drift toward the region of the floating gate over the highly doped source region where the high electric field across the oxide causes the floating gate electrons to tunnel from the gate to the source.

The programming time and erase time of EEPROM and flash memory devices are significantly greater than the write time of a RAM. Moreover, because EEPROM and flash memory cells must be erased prior to the programming or writing of new data, EEPROM and flash memories are not generally useful in applications requiring random access. In certain applications however, where data is accumulated, stored, and retrieved sequentially (such as in many audio applications), EEPROM and flash memory devices are a viable alternative to conventional RAMs and provide the added benefit of non-volatility. In applications where data is written only occasionally but read frequently, EEPROMs and flash memory devices provide densities and read access times comparable to those of RAMs and data storage that is immune to power failure.

Because EEPROMs and flash memories are not random access devices, it is typically necessary to provide an array controller when using them as a storage medium. Two restrictive characteristics of flash memory arrays make array controllers necessary. The first characteristic is that flash memory cells must be erased before they can be written. The second restriction is that flash memory cells cannot be individually erased, but are instead erased in large blocks referred to as sectors. Sector architecture speeds the time required to erase the entire array, but limits the flexibility of the device. In flash memory arrays, an array controller is provided to keep track of the available (i.e. erased) cells and to control the sector erase of the devices.

Prior art flash array management methods contain numerous drawbacks which limit their utility. U.S. Pat. No. 5,404,485 ("the '485 patent"), for example, discloses a virtual mapping system for a flash memory array that allows data to be continuously written to available/array address locations. Designed to enable a flash memory array to be used as a random access storage element, the '485 patent employs a level of overhead that can be eliminated in many applications. The '485 patent performs an elaborate sequence of translations to convert a virtual address into a physical address within a flash memory array. In the method disclosed in the '485 patent, a virtual address is first translated into a logical address and then translated into a physical address. The patent requires two translation steps because addressing of the memory array is accomplished with a block address and a unit address. The unit address changes during a memory update cycle while the block address remains the same.

It will be appreciated to those skilled in the art that the two step translation process required by the '485 slows memory access times and consumes valuable bus bandwidth. Moreover, the requirement that each sector or unit contain a block allocation map reduces the size of the flash memory array available for data storage. In addition, the block allocation map must be altered during a write operation requiring an additional programming cycle in each write cycle. Because programming cycles are generally on the order of 15 microseconds or more, frequent array updates require frequent alteration of the block allocation map slowing down the overall system. In addition, the method disclosed in the '485 patent requires that the virtual map be itself saved in RAM. By requiring that the mapping be saved in RAM, the '485 patent forfeits its immunity to power outages. In addition, conventional flash memory controllers frequently employ copy-erase-copy back procedures to perform updates. Such procedures unnecessarily increase the number of erase cycles thereby negatively impacting the device lifetime. In addition, conventional flash memory controllers use extensive tables or directories to monitor the status of the array. It is therefore desirable to design a method for managing a flash memory array that circumvents these drawbacks.

SUMMARY OF THE INVENTION

The problems outlined above are in large part solved by a simplified and improved flash memory management method. The improved method utilizes a simple architecture in which all of the information necessary to control storage and retrieval of information is saved in a plurality of registers. The contents of these registers can be derived from the contents of the flash memory, which is nonvolatile. Accordingly, the memory controller, in addition to the memory array itself, is immune to power outages. Moreover, by eliminating the virtual map, the simplified flash memory management method eliminates the need to use RAM as part of the flash memory array architecture and reduces cycle time by eliminating virtual map and logical map translations. An improved method hereof incorporates an intelligent algorithm for dedicating one sector as an update sector. The intelligent algorithm randomizes the selection of the update sector in an effort to maximize array lifetime.

Broadly speaking, the present invention contemplates a method of managing a flash memory array. The flash memory array comprises a plurality of erasable sectors. The method begins by assigning one or more of the erasable sectors to the storage array. All sectors not assigned to the storage array are thereafter assigned to the update array. Data files are then sequentially stored in the storage array beginning from a start byte. Each data file is designated as "active" when written. Next, one or more of the active data files are "deleted", preferably by setting a flag with a header of the file. The files are deleted without erasing any of the sectors. After one or more data files has been deleted, the storage array comprises active files and deleted files. Periodically, the storage array is updated by copying the active files from the original locations to locations within an update array. The sectors within the storage array are then erased. The method hereof further contemplates that the update array and the storage array are reassigned.

BRIEF DESCRIPTION OF THE DRAWINGS

Other objects and advantages of the invention will become apparent upon reading the following detailed description and upon reference to the accompanying drawings in which.

Figure 1:
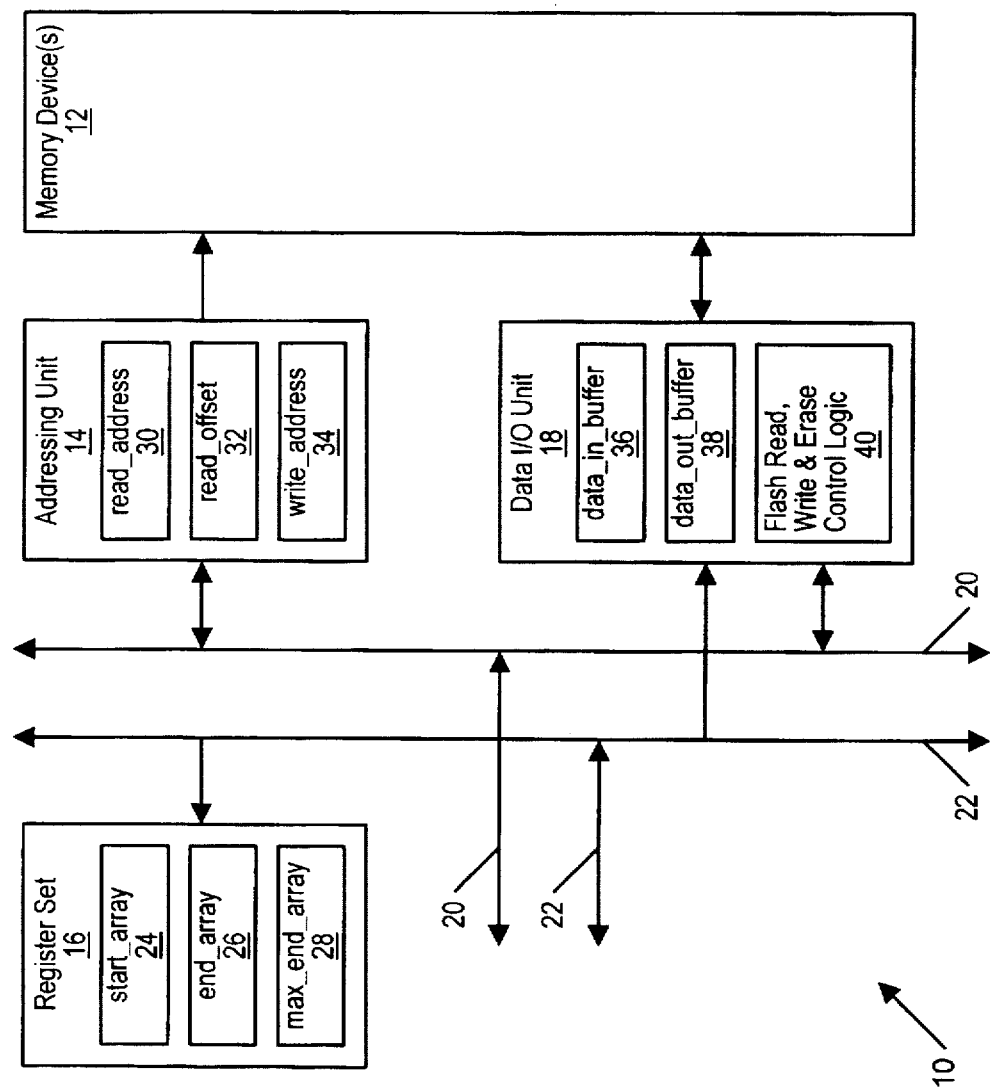
FIG. 1 is a block diagram of a system used to control a flash memory array.

While the invention is susceptible to various modifications and alternative forms, specific embodiments thereof are shown by way of example in the drawings and will be herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of an improved memory management system for use with a memory management method hereof. In one embodiment, the system 10 comprises addressing unit 14, register set 16, data IO unit 18, an address/data bus 20, control bus 22, and a processor not shown in the drawing. The registers in register set 16 may be written to and read from any other counters or registers in addressing unit 14. Register set 16 includes start__array register 24, end__array register 26, and max__end__array register 28. Addressing unit 14 includes read address register 30, read offset register 32, and write address register 34. Data IO unit 18 comprises data in buffer 36, data out buffer 38, and logic 40 to control the read, write, and erase of flash memory array 12.

Figure 1A:
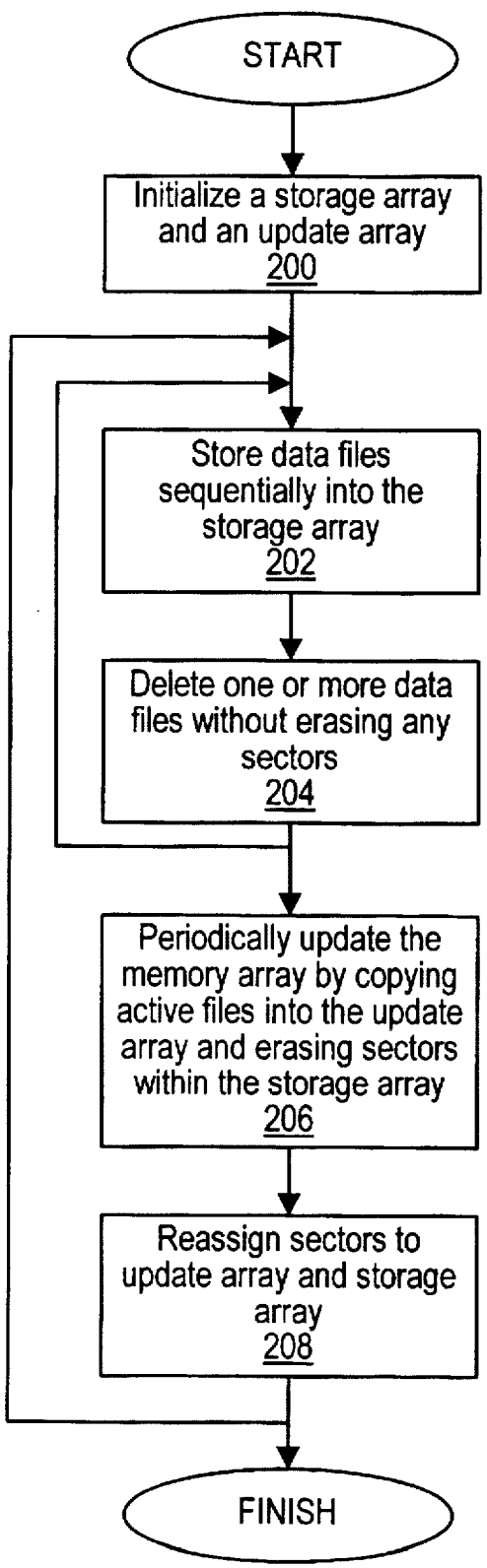
FIG. 1A is a flow diagram of a simplified method for managing a flash memory array.

FIG. 1A shows a flow diagram of an improved method for managing a flash memory array. In a first step 200, a flash memory array is initialized by assigning a first portion of the array as a storage array and a second portion of the array as an update array. The storage array will be used to store one or more data files. The update array will be dedicated as an area of erased cells wherein no data files are stored. The update array will be used only when the memory array is purged of deleted data files during an update procedure as explained more fully below.

After memory array 12 has been initialized in step 200, a plurality of data files are stored sequentially into the storage array during step 202. In a presently preferred embodiment, each stored data file contains a header. Within each header is stored information concerning the status of the data file (active/inactive) and information concerning the length of each file. The status information is used during the elimination of inactive (i.e. deleted) data files during an update procedure. The file length information enables fast searching of the sequentially stored data files by allowing the search routine to jump directly from a first file to a second file if the routine determines that the first file is not the file sought.

In step 204, one or more stored data files are deleted as the files become obsolete or unwanted. In a presently preferred embodiment, deletion is accomplished by simply altering the status information contained in the data file header. The stored data remains intact until the entire memory array is updated. Deletion is accomplished in this fashion to accommodate particular memory technologies, such as flash memories, that are not randomly erasable. Flash memories are typically configured such that large portions or sectors of the array are erased simultaneously. Individual bytes within a flash memory array cannot be independently erased.

After one or more data files have been deleted in step 204, the storage array of memory array 12 comprises one or more active files and one or more deleted files. Periodically, memory array 12 is updated to reclaim the memory space occupied by deleted (but not erased) data files. Update procedure 206 comprises copying the active files within the storage array to the update array and then erasing the storage array sectors. After completion of the update procedure memory array 12 will comprise one or more active data files stored in contiguous array locations. The remainder of memory array 12 will consist of erased data sectors.

The cycle is completed by reassigning the update array and the storage array in step 208. The reassigned storage array will preferably begin at the first array location of the first active file. In one embodiment, the reassigned update array will consist of the memory array sector logically previous to the beginning on the reassigned storage array. Those skilled in the art will appreciate that the repeated reassignment will result in the update array moving randomly throughout the sectors of memory array 12. It is desirable to move the update array randomly so that sector erases during the update procedure are distributed evenly throughout the array. Each sector within a flash memory array can endure only a finite number of sector erases. Randomly distributing the sector erases therefore maximizes the lifetime of the array.

Figure 2:
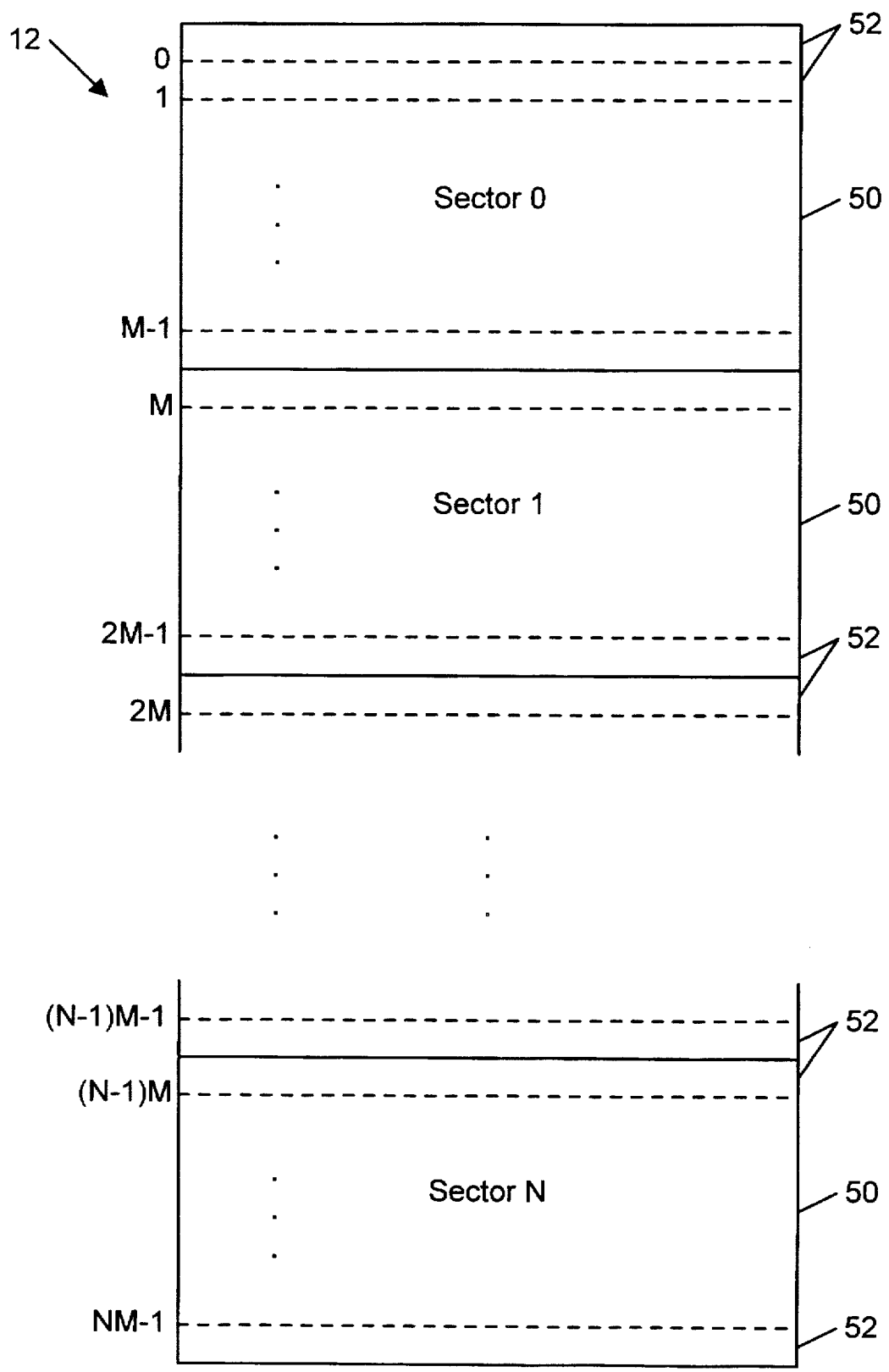
FIG. 2 is a block diagram of a uniform sector flash memory device.

FIG. 2 is a block diagram of flash memory array 12. Preferably, array 12 comprises N uniform sectors 50, each sector comprising M addressable locations 52. In one embodiment, addressable locations 52 are configured as eight bit bytes. Each addressable location 52 may be individually read or programmed. Each sector 50 may be individually erased. When a sector 50 is erased, each addressable location 52 within the sector is erased.

Figure 3:
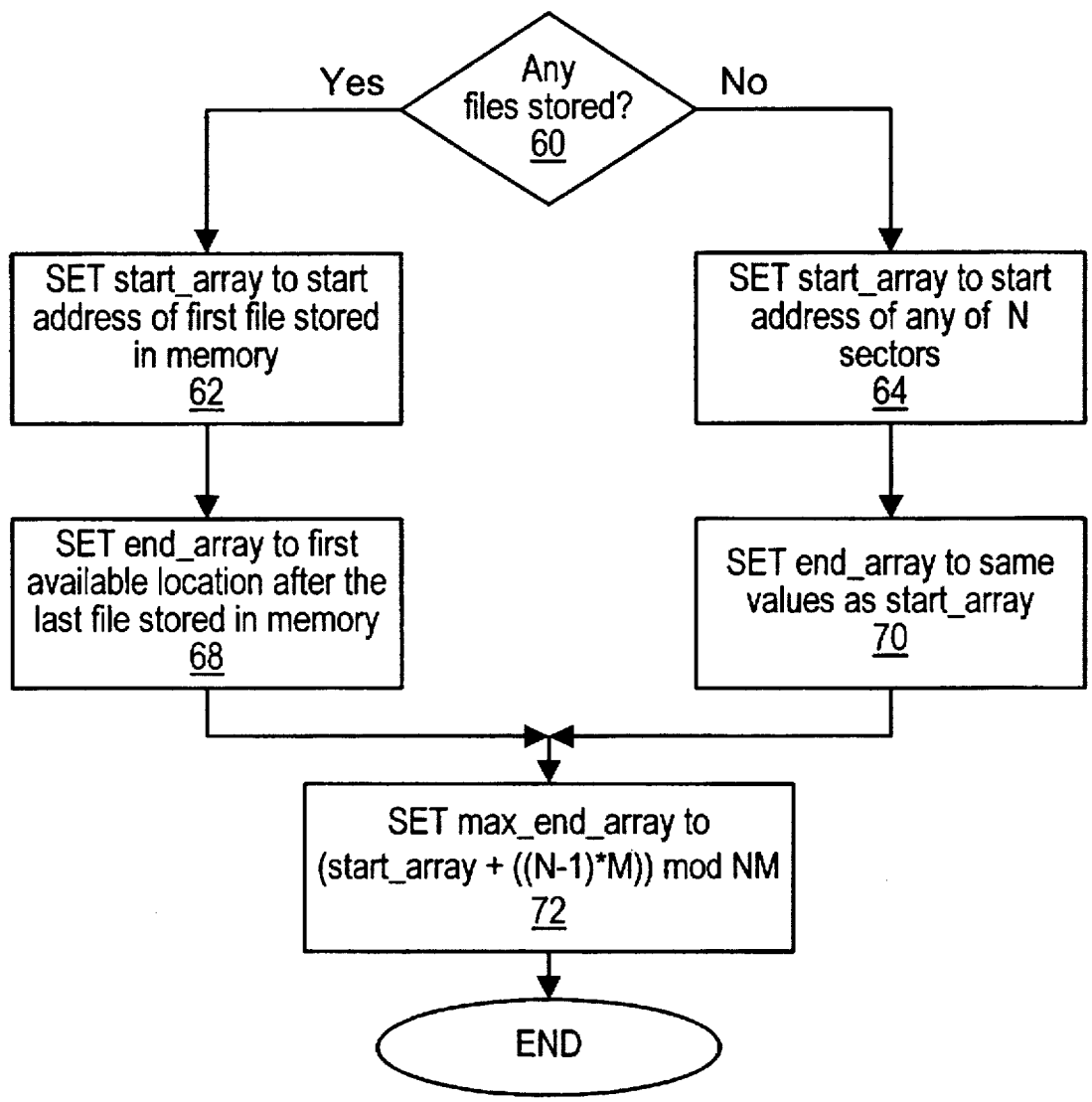
FIG. 3 is a flow diagram of a register initialization routine.

FIG. 3 shows a flow diagram of an initialization routine used in an embodiment of the method hereof. In step 60, the initialization routine determines if any files have been stored in flash memory array 12. If system 10 determines that files have been stored in memory array 12, start_array 24 is set to the start address of the first file stored in memory in step 62. After setting start_array 24, system 10 sets end_array 26 to the first available location after the last file stored in memory in step 68. If it is determined in step 60 that no files have been stored in memory array 12, system 10 sets start_array 24 to the start address of any of the sectors 50. Referring back to FIG. 2, it can be seen that the starting addresses for each sector 50, wherein each sector contains M addressable locations are 0, M, 2M, . . . (N−1)M. Returning now to FIG. 3, after start_array 24 has been set in step 64, end_array 26 is set to the same value as start_array 24 in step 70. After start_array and end_array have been set, the initialization routine sets max_end_array register 28. According to the formula shown in FIG. 3, step 72, max_end_array equals (start_array+((N−1)*M))mod NM. In the formula, the "mod" operator signifies the modulo function. The modulo function effectively divides the operator by the operand and discards all but the remainder, leaving the remainder of the division as the answer. For example, 7 modulo 5=2. The modulo function is useful in memory arrays where the addressing is logically continuous. When an address counter is incremented past the maximum value of the array, it returns to 0 and starts counting from 0. Thus, memory address 0 is logically subsequent to memory address location N×M−1.

The formula disclosed in step 72 defines an upper boundary (max_end_array) on the locations with memory array 12 available for storing data. System 10 will not write data files into memory array 12 at max_end_array or memory locations beyond max_end_array. In one embodiment, one or more of the N sectors is free of stored data. This free or dedicated sector will later be used during the update procedure. The formula in step 72 sets max_end_array 28 such that all but one sector may be written into. As an example, if start_array equals 0, N equals 4, and M equals 16, max_end_array will be equal to 48. Thus, address locations 0 through 47 of memory array 12 would be available for writing (and reading) while address locations 48 through 63 would be preserved for a subsequent update. Although only one sector 50 is reserved in this example, it is possible to reserve more than one sector as the update sector.

Figure 4:
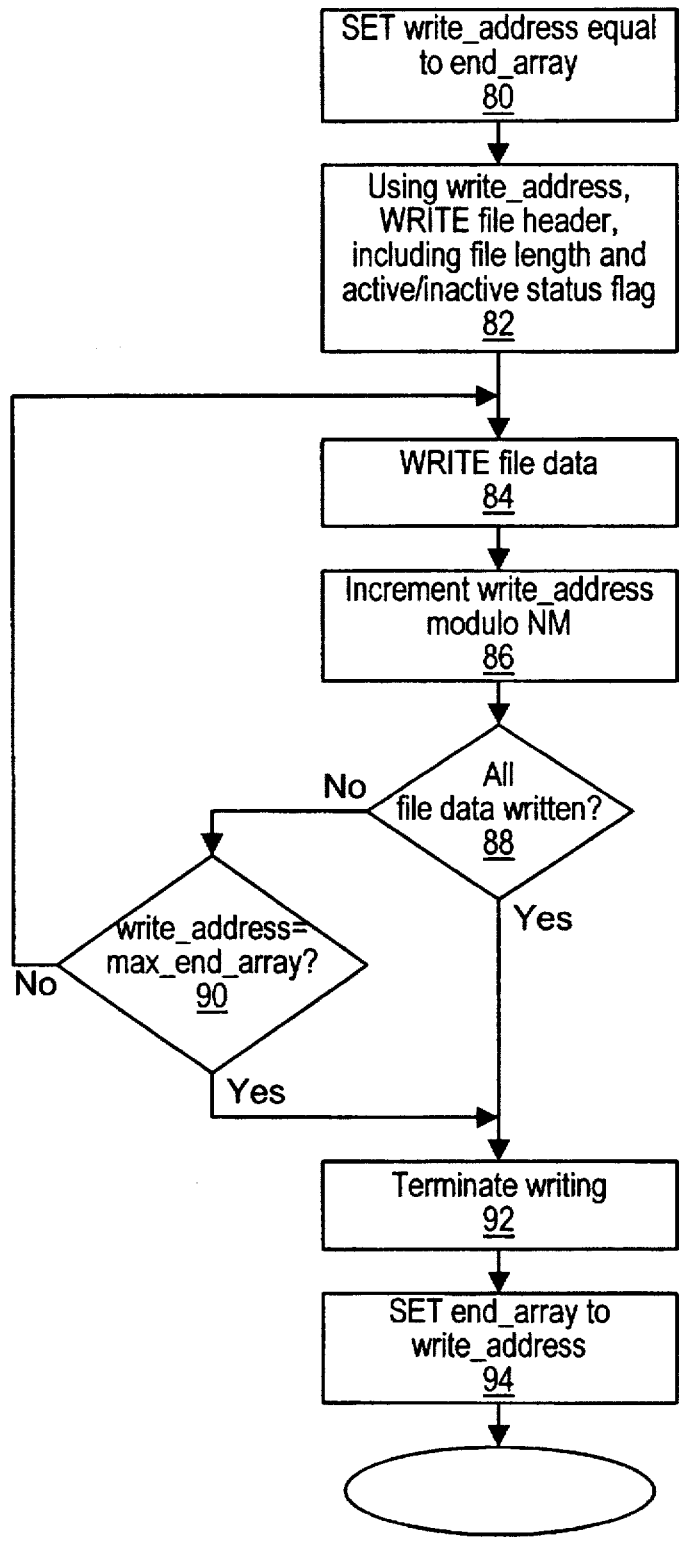
FIG. 4 is a flow diagram of a data file write procedure used.

FIG. 4 shows an embodiment of a file write procedure for use in the improved file management method hereof. In this simple procedure, write address register 34 is set equal to end_array 26 in step 80. Step 80 ensures that subsequently written data will not overlap previously written data. In step 82, system 10 writes the file header, including a file length and an active/deleted status flag into memory array 12 starting at the address indicated by write address register 34. In situations where the file length is not known until after the file is written, the file length location within the header left blank when the file header is written. The file length can be written into the header after completion of the file storage.

Figure 5:
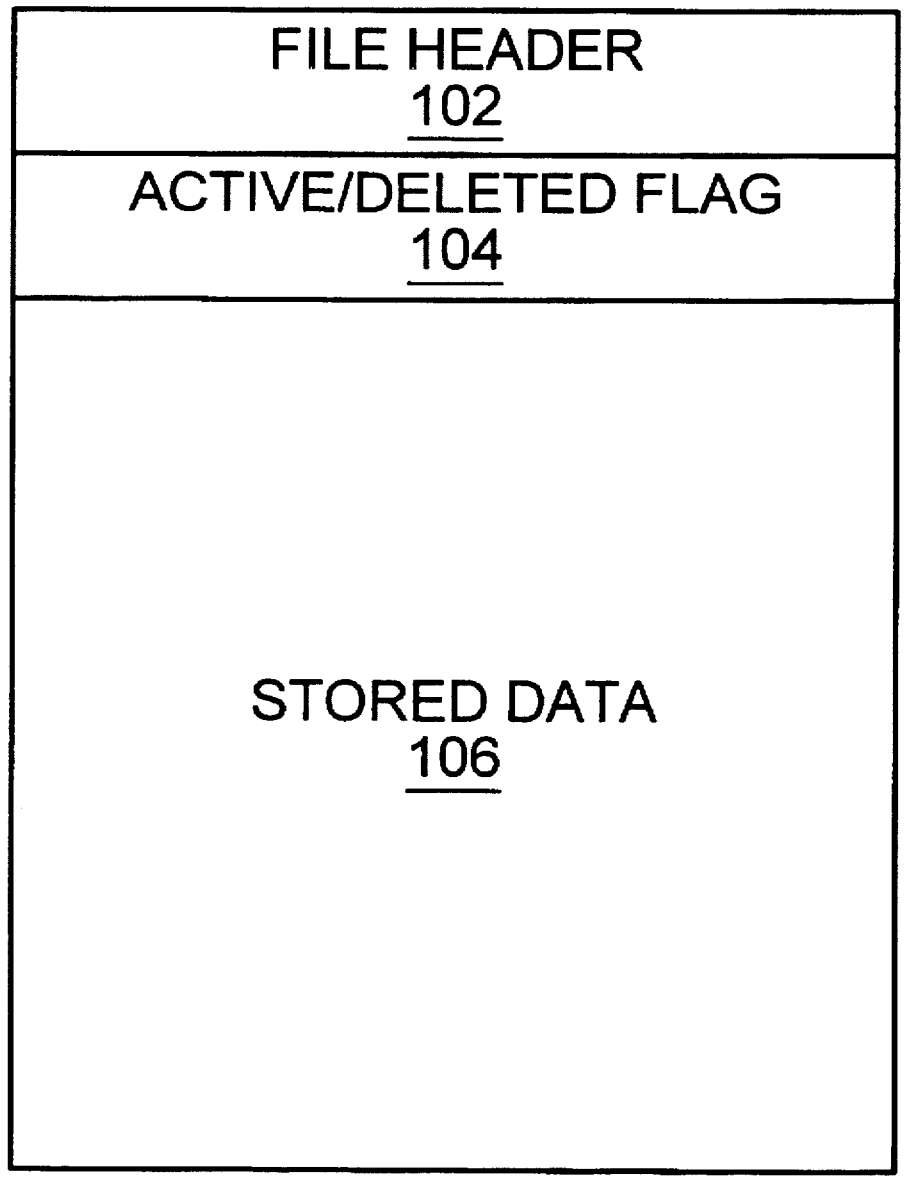
FIG. 5 is a block diagram of a data file.

Turning briefly to FIG. 5, a presently preferred embodiment of a data file 100 is shown. Data file 100 comprises file header 102, status flag 104, and stored data 106. File header 102 contains information about the length of data file 100, in addition to other information as necessary or as desired. Status flag 104 indicates whether the data file 100 is active or has been deleted.

Returning now to FIG. 4, after file header 102 and status flag 104 have been written into data file 100, system 10 begins writing data into file 100. In step 84, data is written into one addressable location or, in a preferred embodiment, one byte of memory array 12. System 10 then increments write address 34 modulo NM, where modulo is the function described above and NM represents the number of sectors 50 multiplied by the number of addressable locations M per sector. Using the previous example with N=4 and M=16, NM is 64. Thus, if write address register 34 is equal to 63 or 3F (hexadecimal), incrementing write address register 34 results in write address register 34 equaling 0. Next, system 10 checks to see whether the entire file has been written in step 88. If less than all of the file data has been written, system 10 performs an additional check to see whether write address register 34 is equal to max_end_array 28 in step 90. If write address register 34 is equal to max_end_array 28, then the system terminates writing in step 93 because the system has reached the boundary of the update array into which files cannot be written. If less than all of the file data has been written and the write address register 38 does not equal max_end_array 28, then system 10 branches back to step 84 to write another byte of data. This loop is continued until either the entire data file has been written or write address register 38 equals max_end_array register 28, at which point, the system terminates writing in step 92. After writing has been terminated in step 92, system 10 sets end_array 26 to write address 34 in step 94. This update of end_array 26 is necessary to prevent subsequent writes onto the file which has just been written.

Figure 6:
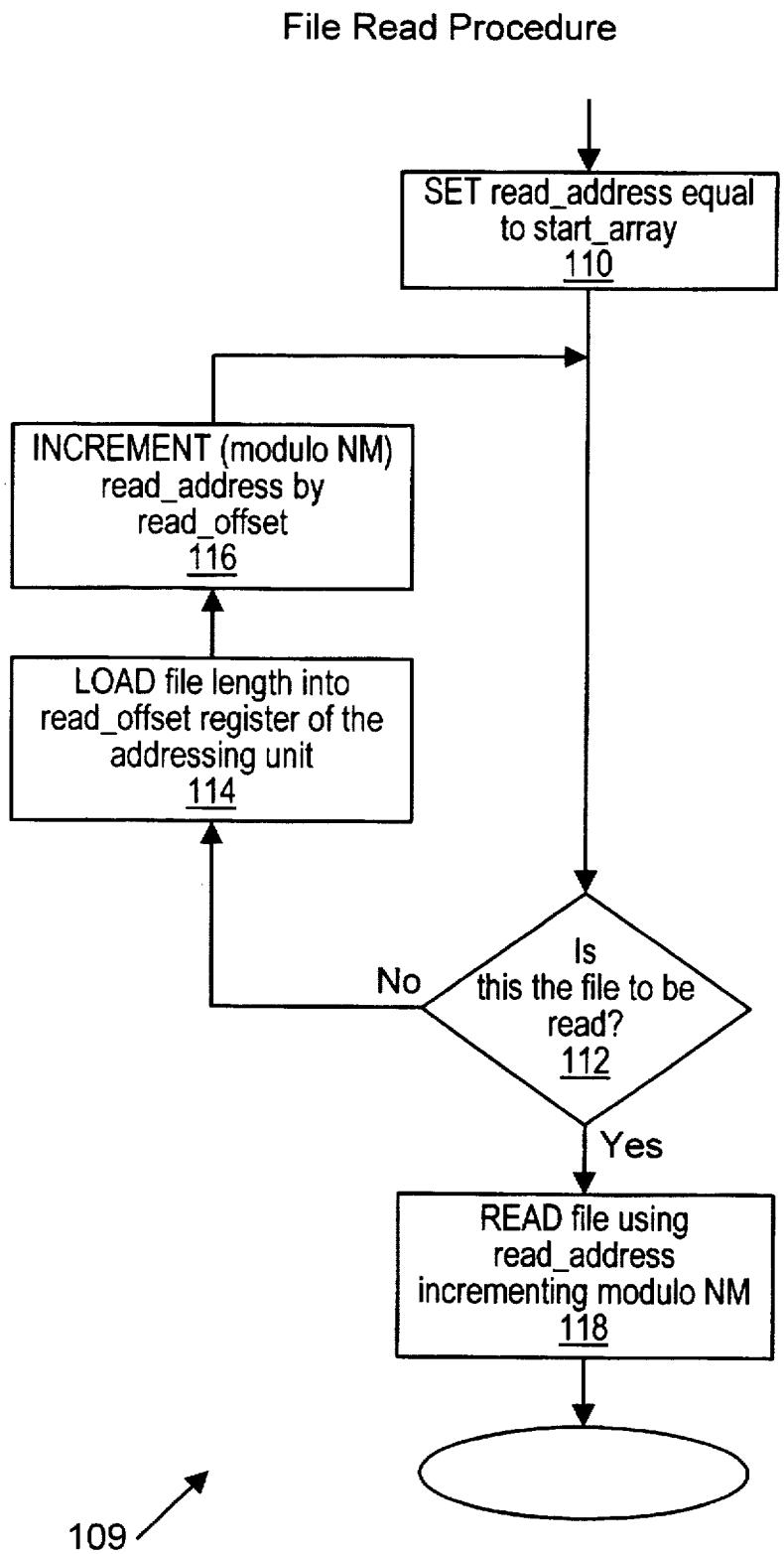
FIG. 6 is a flow diagram of a file read procedure.

In FIG. 6, one embodiment of a file read procedure 109 is shown. System 10 sets read address register 30 equal to start_array 24. This step sets system 10 at the first file in memory array 12. System 10 then determines whether this file is the file to be read in step 112. In one embodiment, this determination can be made by accessing the information located within file header 102. If the current file is the file to be read, then system 10 begins sequentially reading the individual addressable locations within the data file and incrementing read address register 30 after each read. This process continues for the number of cycles determined by the file length information located in file header 102. If system 10 determines that the current file is not the file to be read in step 112, the file length is loaded into read offset register 32 in step 114 and read address 30 is then incremented modulo NM by the value in read offset register 32 in step 116. Steps 114 and 116 increment read address register 30 such that system 10 is now pointing to the next file. System 10 then checks the new current file to see if it is the file to be read and continues this process until it finds the file to be read and reads the file using read address 30 which is incremented modulo NM in step 118.

Figure 7:
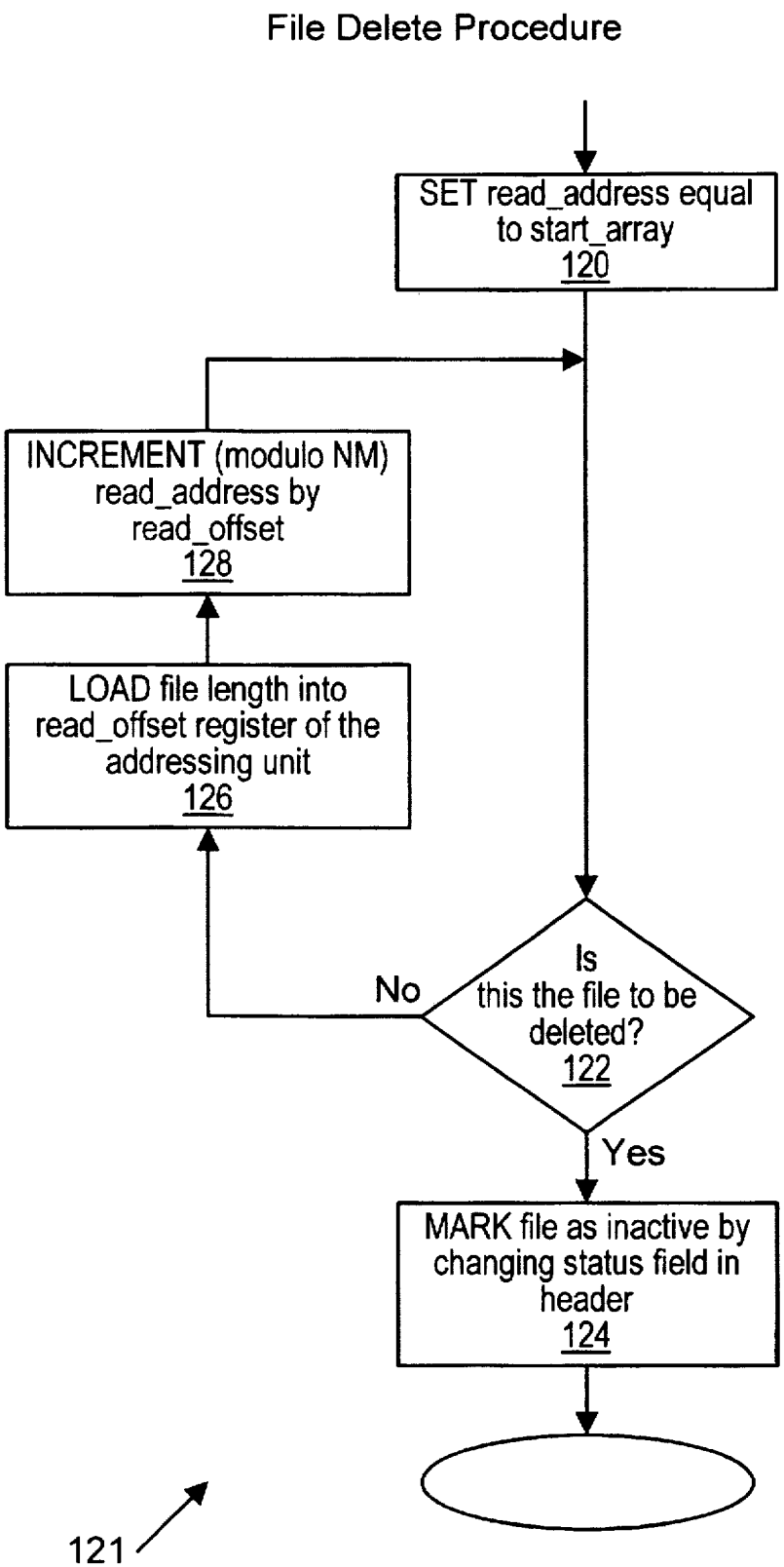
FIG. 7 is a flow diagram of the file delete procedure.

In FIG. 7, one embodiment of a file delete procedure 121 is shown. Read address 30 is set to start_array 24 in step 120, and system 10 determines if the current file is the file to be deleted in step 122. If the current file is the file to be deleted, system 10 marks the file as inactive by changing status flag 104 in data file 100. If system 10 determines that the current file is not the file to be deleted in step 122, file length information is loaded into read offset register 32 and read address 30 is incremented by the value in read offset register 32 in steps 126 and 128 respectively until the sought after file is deleted.

Figure 8:
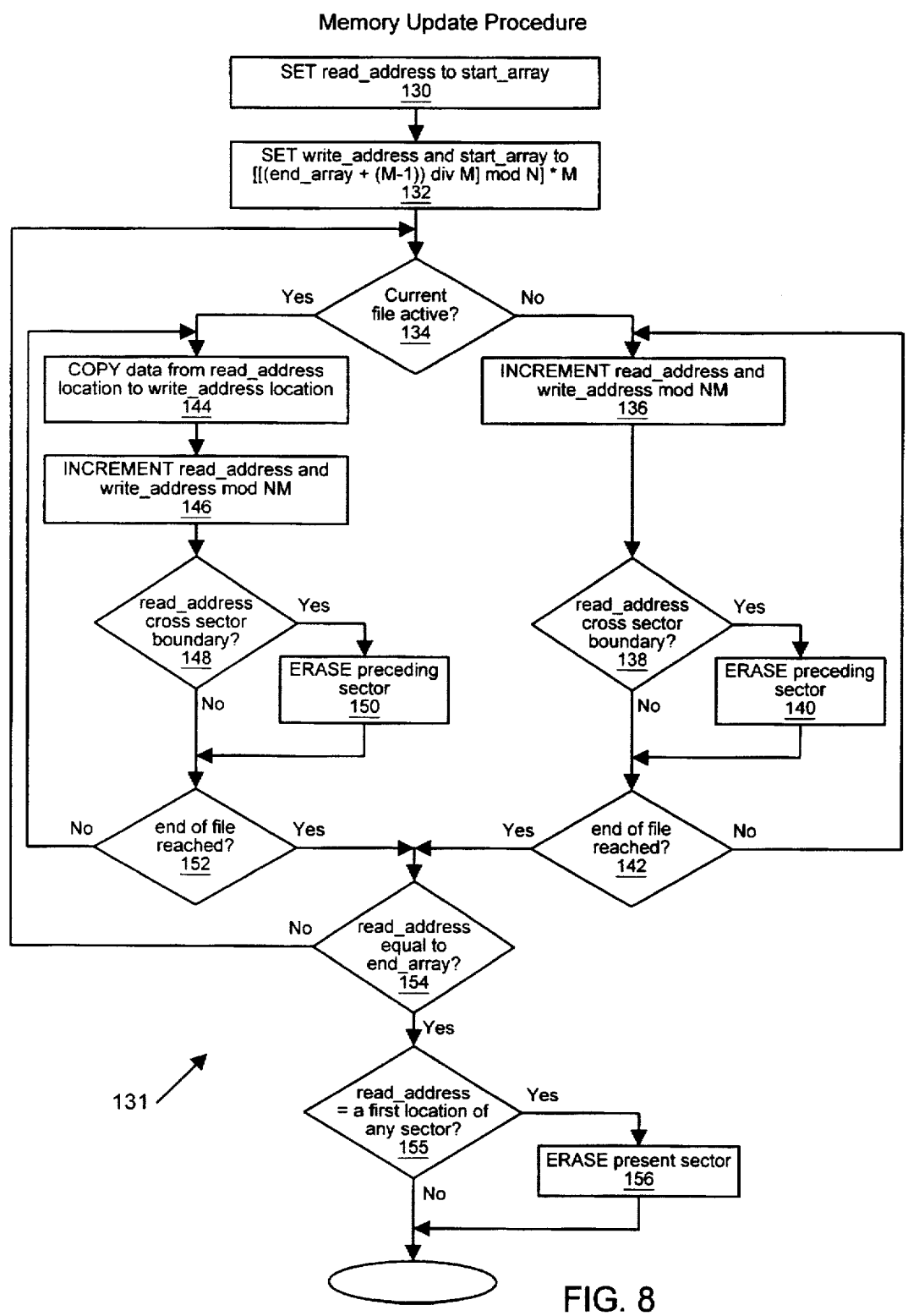
FIG. 8 is a flow diagram of a memory update procedure.

FIG. 8 shows an embodiment of a memory update procedure 131. Update procedure 131 is used to reclaim array locations occupied by files which have been deleted but not erased. Generally, the update procedure operates by setting read address register 30 to start_array 24, setting write address register 34 to the first location in the update sector, and sequentially copying active files from their read address locations to locations within the update sector. If, during this copying process, read address register 30 crosses a sector boundary, the previous sector is erased. The erased sector will then be available as an extension of the update sector. After all active files have been copied into the update sector (and its extensions), a final sector erase is performed. After an update, array 12 comprises a single contiguous block of active data files and a single contiguous block of erased cell locations.

Update procedure 131 is initiated by setting read address register 30 to start_array 24 in step 130. Next, write address register 34 is set according to the equation shown in step 132. This equation sets write address register 34 to the first addressable location of the first sector that is logically subsequent to the sector to which end_array 26 is pointing. This step is discussed in more detail in FIGS. 9-14 which depict the operation of the flash memory management method hereof. Alternatively, write address can be set to point to any erased sector that is outside of the storage array. After setting read address 30 and write address 34, update procedure 131 determines if the file pointed to by read address 30 is active in step 134. If the file is active, update procedure 131 starts copying data from read address 30 to write address 34 in step 144 and incrementing both address registers. If during this process, read address 30 crosses from a first sector to a second sector, the first sector is erased in step 150. This copying and incrementing continues until the end of file is reached. If step 134 determines that the current file is not active, update procedure 131 simply increments read address 30 in step 136 and determines whether read address 30 has crossed a sector boundary in step 138. If read address 30 has crossed a sector boundary, the preceding sector is erased in step 140. This incrementing of read address 30 continues until the end of file is reached. After the end of file has been reached in either step 152 or step 142, update procedure 131 determines whether read address 30 is equal to end_array 26 in step 154. If not, the procedure returns to step 134 where it is determined whether the current file is active and the loop proceeds accordingly. When read address 30 is equal to end_array 26, all active files have been moved to the update array and the update procedure branches to step 155. In step 155, system 10 determines whether read_address is pointing to the first memory location of any of the plurality of sectors 50. In step 156, system 10 performs a final erase on the sector to which read address 30 is pointing unless it was determined in step 155 that read_address is pointing to the first location within any of the sectors. No final sector erase done if read_ address is pointing to the first memory location of any of the plurality of sectors 50 because read_address is pointing to a "clean" sector. The utility of the above procedures can be better comprehended with reference to FIGS. 9-14 which detail the operation of the flash memory management procedure hereof.

Figure 9:
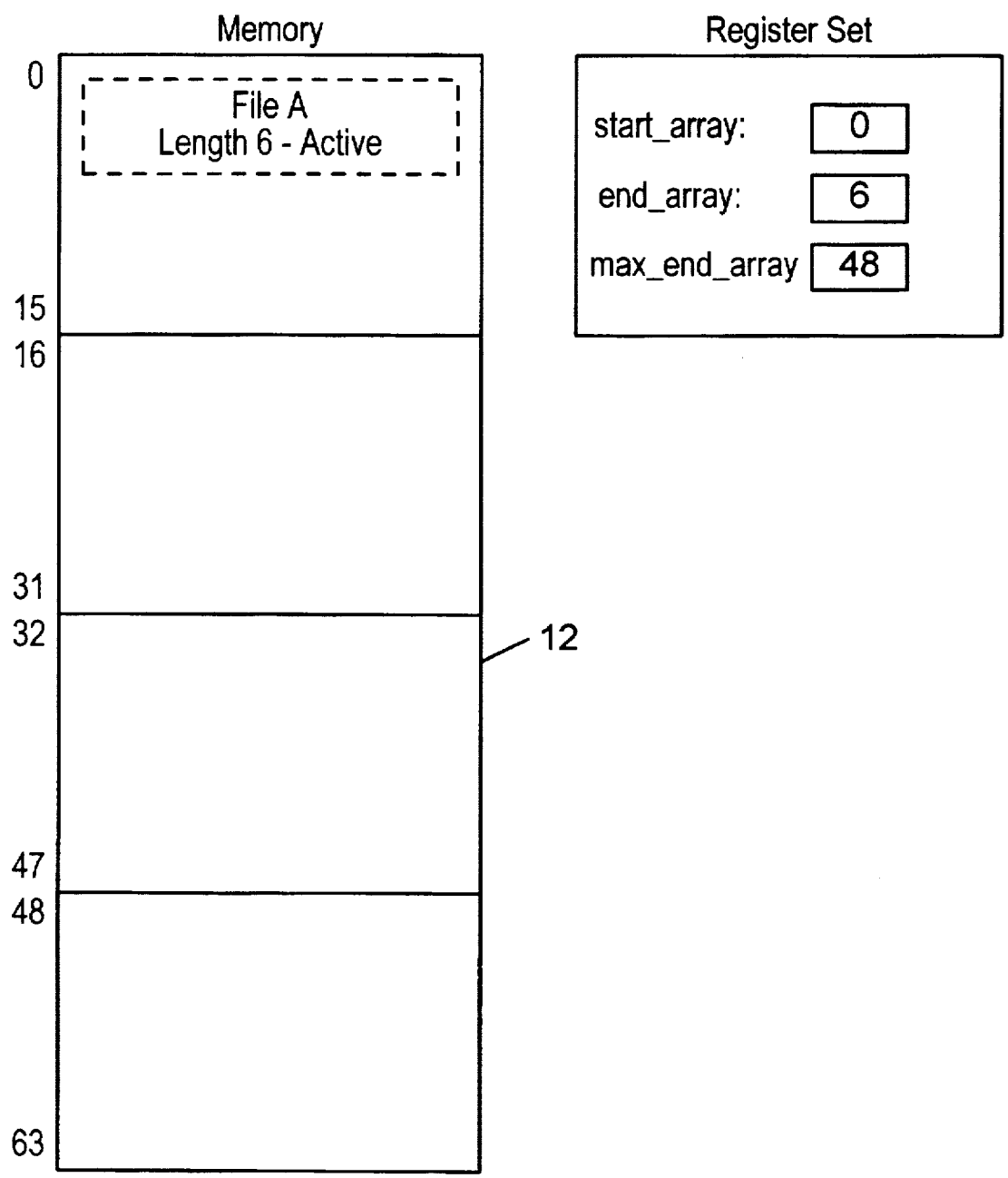
FIG. 9 is a block diagram of the flash memory array and the register set after a write operation using the method hereof.
Figure 10:
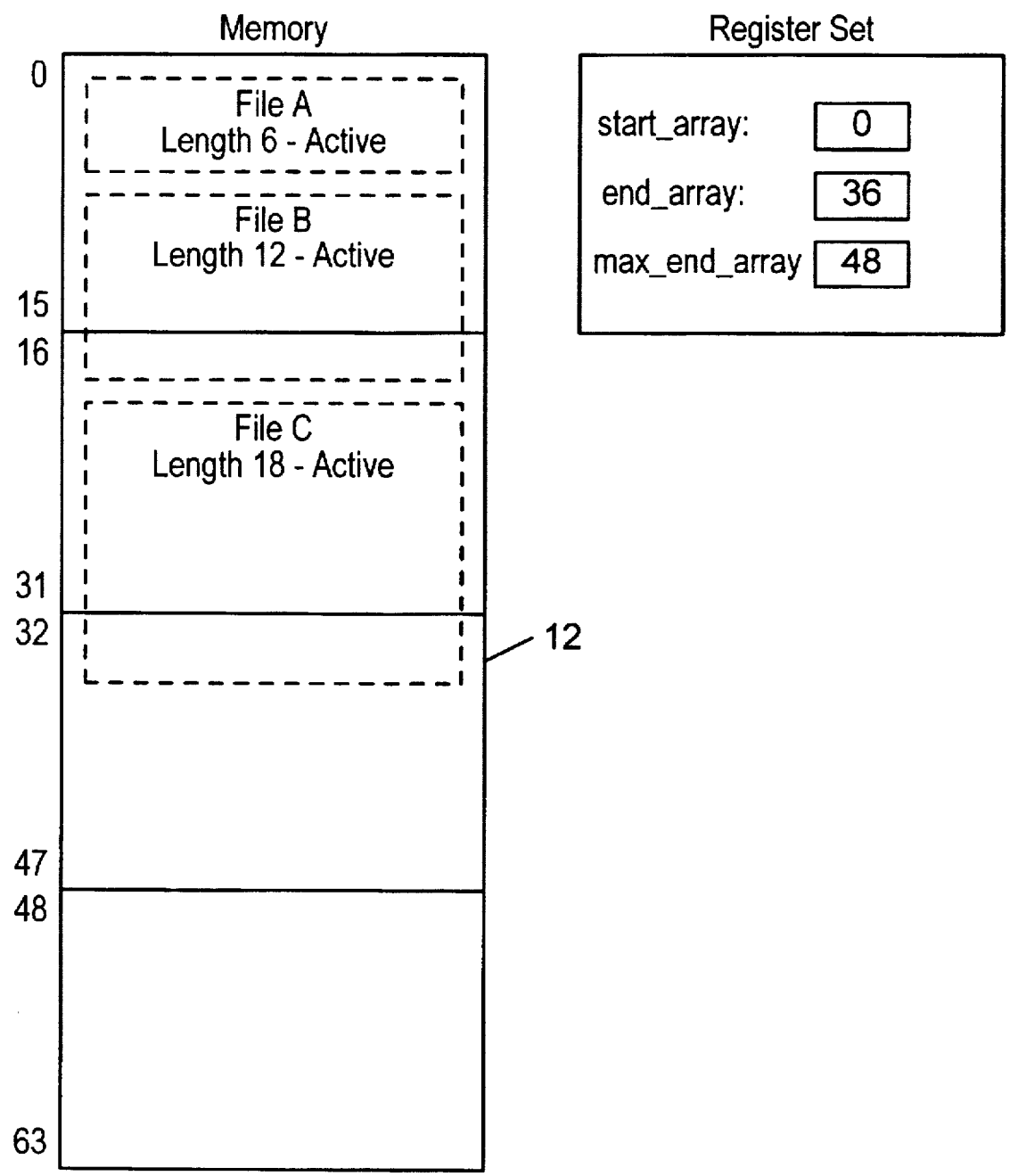
FIG. 10 is a block diagram of the flash memory array and register set after three files have been written in accordance with the method hereof.
Figure 11:
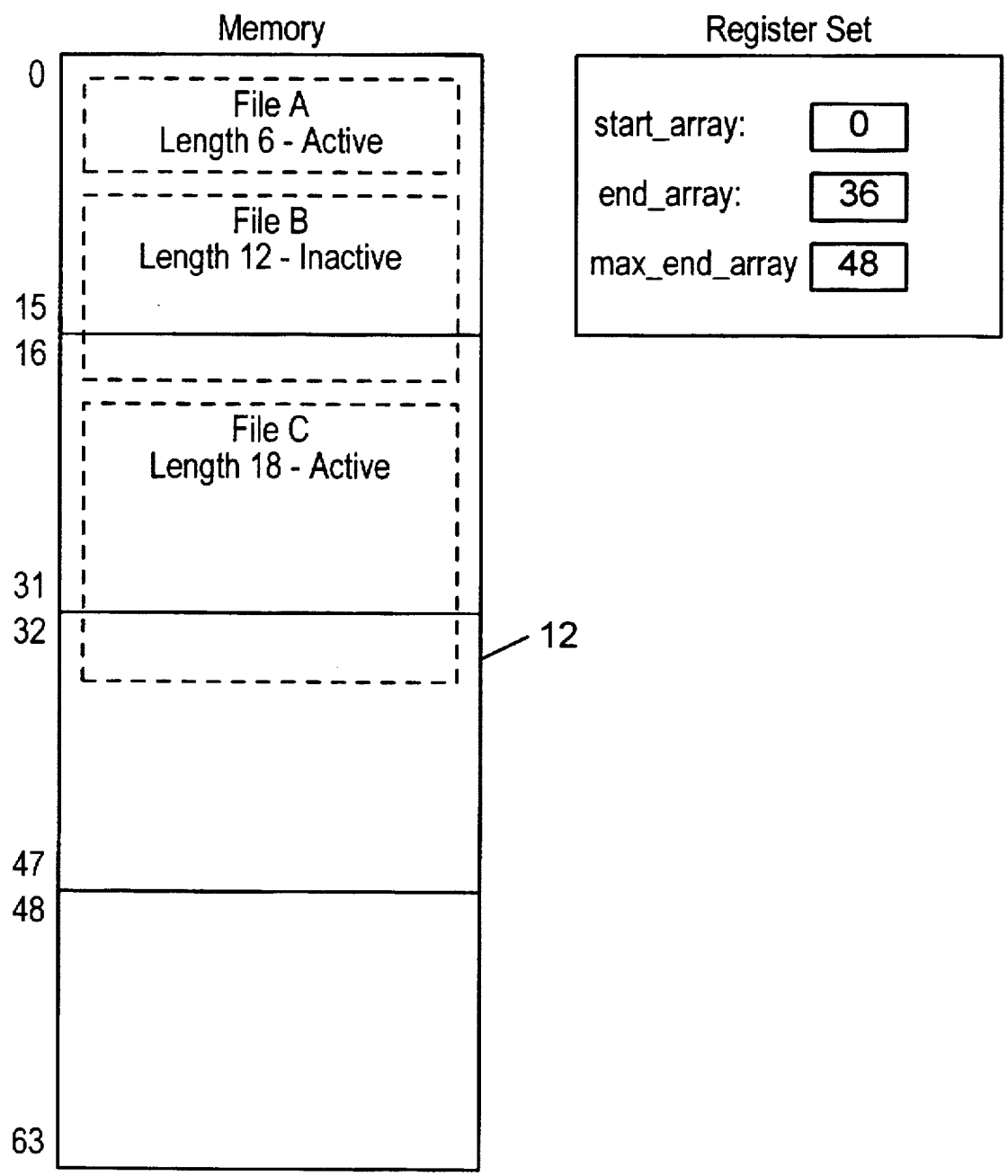
FIG. 11 is a block diagram of the flash memory array and the register set after one of the three written files has been deleted in accordance with the method hereof.

FIG. 9 shows the state of memory array 12 after a single file, denoted as file A, of length 6 has been written into array 12. Prior to the writing of file A, the initialization procedure was performed during which start_array 24 was set to 0, end_array 26 was set to 0, and max_end_array 28 was set to 48 in accordance with the formula described in FIG. 3. After the write procedure, it can be seen in FIG. 9, that end_array 26 is equal to 6. FIG. 10 shows memory array 12 after two additional files, file B of length 12 and file C of length 18 have been written into array 12. End_array 26 has been updated to 36, start_array 24 is still 0, and max_end_ array 28 is still 48. FIG. 11 depicts the array after deletion of file B. Although file B has been deleted, it is still occupying array locations within array 12. Deletion is indicated by status flag 104 located within the header 102 of file B.

Figure 12:
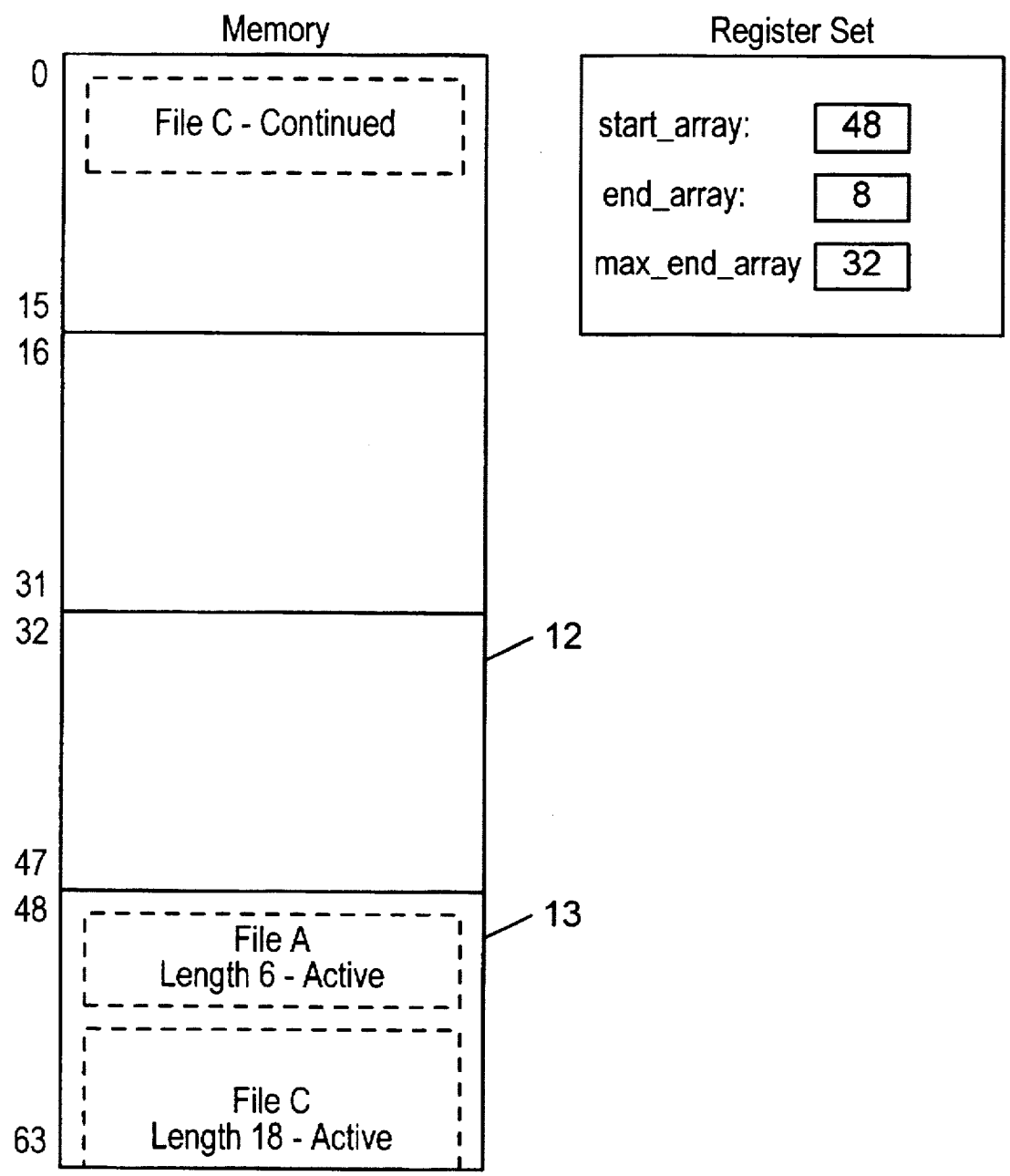
FIG. 12 is a block diagram of the flash memory array and accompanying register set after execution of an update cycle in accordance with the method hereof.
Figure 13:
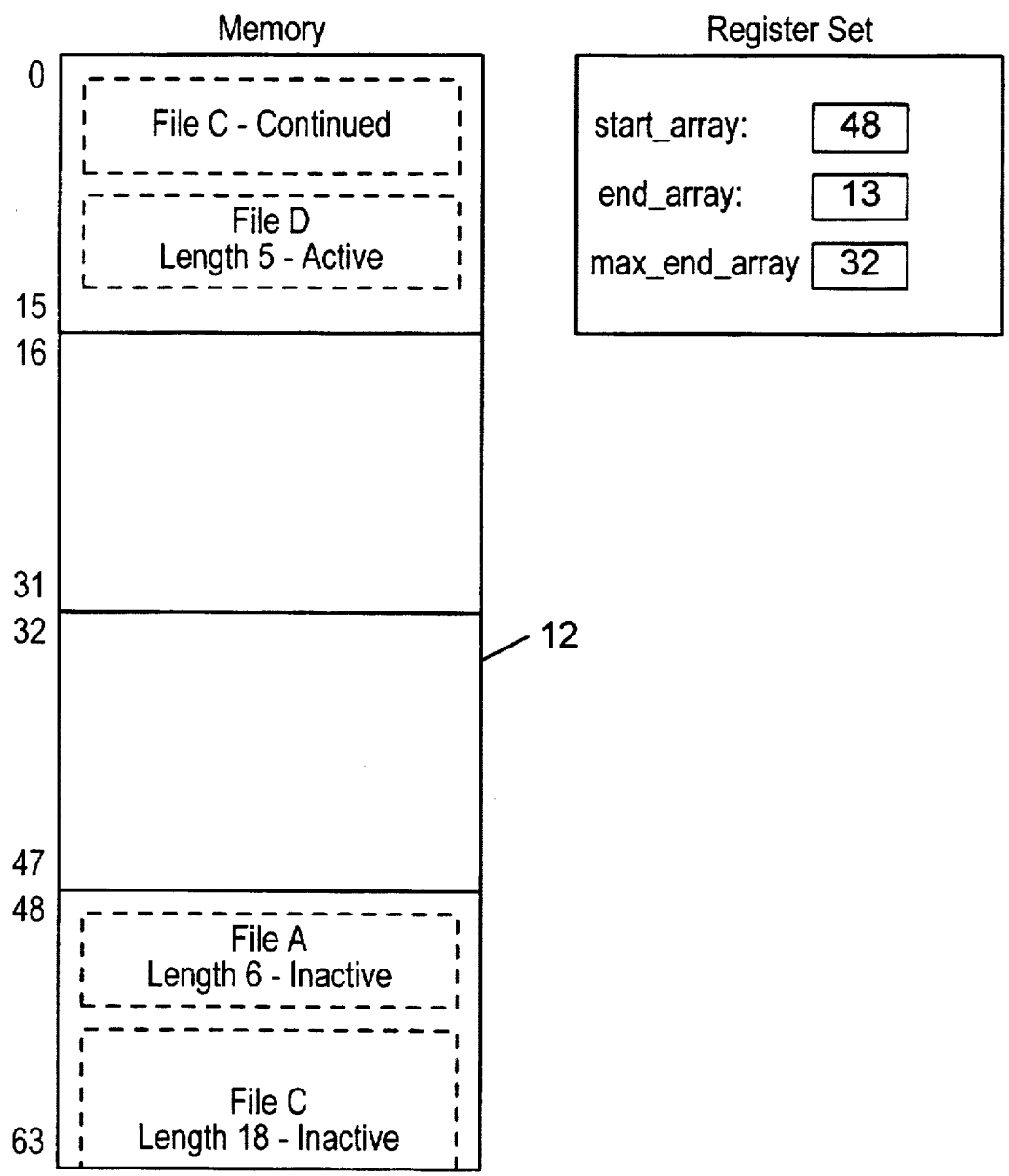
FIG. 13 is a block diagram of the memory array and accompanying register set after execution of an additional file write procedure in conjunction with the method hereof.
Figure 14:
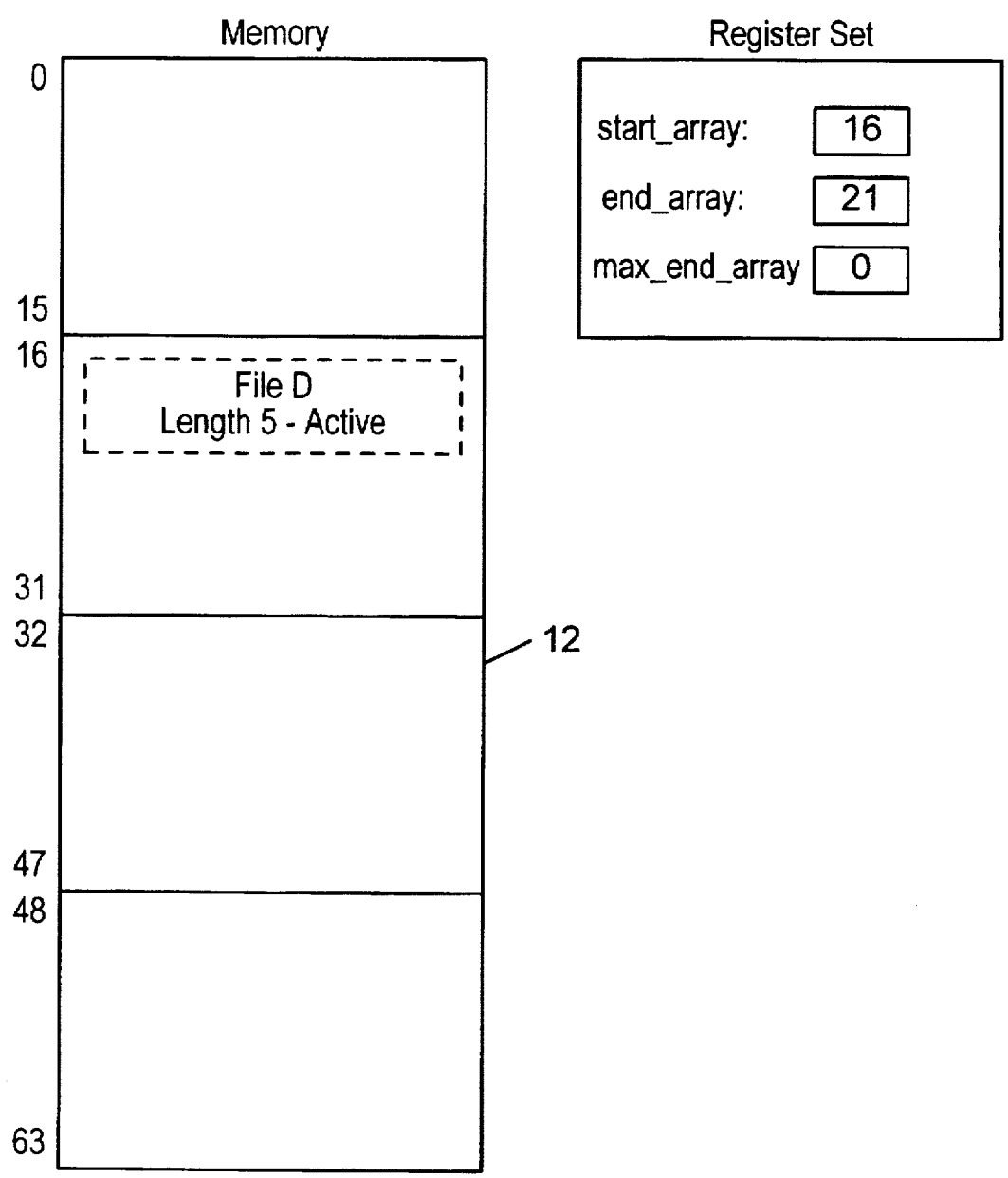
FIG. 14 is a block diagram of the flash memory array and accompanying register set after execution of a second memory update procedure in accordance with the method hereof.

FIG. 12 shows the state of the memory array 12 after execution of memory update procedure 131. Active files A and C have been copied into dedicated sector 13 during the update procedure. Sector 0 was erased and logically appended to dedicated sector 13 when read address 30 incremented from 15 to 16. When the copying of file C reached the highest address of sector 3, the copying continued in sector 0. After completion of the update procedure, start_array is 48, end_array 8, and max_end_array equals 32. FIG. 13 shows the state of memory array 12 after the additional writing of a fourth file, file D, of length 5 and the deletion of files A and C, which are noted as inactive in the drawing. Finally, in FIG. 14, memory array 12 is shown after a second update procedure 131 has been performed. Referring back to FIG. 13, it can be seen that two sectors are free of stored values prior to the execution of the update procedure. The update sector itself (sector 2 in this example) will always be free of stored data prior to execution of an update because the method hereof prohibits the storing of data files prior to update. In the example shown in FIG. 13 however, an additional sector (sector 1) is also free of stored data. When more than one sector is free of stored data prior to initiation of the update procedure, any of the free sectors may serve as the sector into which copying will begin.

In one embodiment, the update sector may always be chosen as the first sector into which information will be copied during update. This would be accomplished by setting write address 34 and start_array 24 equal to max_ end_array 28 in step 132 of FIG. 8. Alternatively, the sector which is logically subsequent to the sector in which the last data file was stored can served as the initial update sector. For the example depicted in FIG. 13, the last data file stored (File D) is stored in sector 0. Thus, sector 1 could serve as the initial update procedure. The formula for determining the first addressable location of the initial update sector is disclosed in step 132 of FIG. 8 as:

$$[[(end\_array+(M-1)div\ M]mod\ N]*M$$

where A div B is equal to the integer portion of A/B (e.g. 7 div 3=2).

Update procedure 131 has eliminated inactive files A and C while file D has been copied into the update sector. After execution of this second memory update procedure, note that start_array is 16 and max_end_array 28 is 0.

It is to be understood that the form of the invention shown and described in the detailed description and the drawings is to be taken merely as presently preferred examples of how a flash memory array can be managed with a simplified method. Obvious variations of the method disclosed would be apparent to those skilled in the art having the benefit of this disclosure. It is intended that the following claims be interpreted broadly to embrace all the variations of the preferred embodiments disclosed.

What is claimed is:

1. A method of managing a memory array having a plurality of erasable sectors, comprising the steps of:
    initially assigning at least one of said plurality of erasable sectors as a storage array and at least one of said plurality of erasable sectors as an update array;
    writing at least one data file into said storage array sequentially beginning at a starting location within said storage array, each said data file being initially designated as an active file;
    deleting at least one said active file by re-designating at least one said active file as a deleted file such that said storage array comprises at least one active file and at least one deleted file and wherein said deleting is accomplished without erasing any of said plurality of erasable sectors; and
    updating said memory array by copying said one or more active files from said storage array to said update array and erasing said plurality of erasable sectors within said storage array.

2. The method of claim 1 further comprising the step of reassigning one or more of said plurality of erasable sectors as said storage array and one or more of said plurality of erasable sectors as said update array.

3. The method of claim 1 wherein only one of said plurality of erasable sectors is initially assigned as said update array.

4. The method of claim 3 wherein the step of initially assigning at least one of said plurality of sectors comprises the steps of:
    selecting one of said erasable sectors as a starting sector;
    setting a start_array register to the address of a first memory cell of said starting sector;
    selecting a sector logically previous to said starting sector as an update sector; and
    setting an max_end_array register to the address of a first memory cell of said update sector.

5. The method of claim 1 wherein said writing at least one data file comprises, for each said data file, the steps of:
    setting a write_address equal to a value contained in an end array register;
    selecting a first addressable portion of said data file as a selected portion;
    for each addressable portion of said data file, writing said selected portion into said storage array at said write address, selecting a next portion of said data file as said selected portion, and incrementing said write_address; and
    setting said end array register to said write address.

6. The method of claim 1 wherein the step of updating said memory array comprises the steps of:
    selecting a starting location;
    setting a read_address to said starting location;
    setting a write_address to a first location of said update array;
    selecting a data file beginning at said starting location as a copy file;
    determining if said copy file is an active file; and
    if said copy file is active and for each addressable portion of said copy file, reading a copy portion at said read_address, writing said copy portion to said write_address, incrementing said read_address and said write_address, and, if said read_address is no longer within the same sector as the previous read_address, erasing the previous sector.

7. The method of claim 1 wherein said data files are designated as active or deleted according to a flag within a header of said data files.

8. A system for managing data files in a memory array having a plurality of erasable sectors, comprising:
    a microprocessor;
    an array addressing unit comprising a plurality of registers;
    a data I/O unit comprising a data-in buffer, a data-out buffer, and logic for controlling reading, writing and erasing of said memory array;
    a bus connecting said microprocessor, said array addressing unit, said data I/O unit, and said memory array; and
    electronic storage means comprising instructions such that, when said instructions are executed by said microprocessor, said system will:
        initially assign one or more of said plurality of erasable sectors as a storage array and one or more of said plurality of erasable sectors as an update array;
        store one or more data files into said storage array beginning at a starting location within said storage array, each said one or more data files having a header and each said one or more data files being initially active;
        delete one or more of said data files by setting a flag in said header of each said one or more files to be deleted such that, after said deleting, said storage array comprises one or more active files and one or more deleted files; and
        update said memory array by copying said one or more active files from said storage array to said update array and erasing said plurality of erasable sectors within said storage array.

9. The system of claim 8 wherein said memory array is a flash memory array comprising flash memory cells.

10. The system of claim 9 wherein each one of said sectors contains a uniform number of said flash memory cells.

11. The system of claim 10 wherein there are N logically sequential said sectors and wherein each one of said N sectors contains M said flash memory cells.

12. The system of claim 11 wherein said electronic storage means further comprises instructions such that, when said instructions are executed by said microprocessor, said system will:

dedicate one of a plurality of data registers as a start_array register;

dedicate one of said plurality of data registers as a max_end_array register;

set said start_array register to the address of the first memory cell within one of said N sectors;

set said max_end_array register to (start_array+((N−1)*M)) modulo NM;

initiate said store one or more data files from the address stored in start_array; and prohibit writing to any said memory cell not within the memory cell range from start_array to max_end_array.

13. The system of claim 11 wherein said update comprises:

dedicate one of said plurality of data registers as the start_array register, said start_array register used to indicate the original cell location of said writing;

dedicate one of said plurality of data registers as the end_array, said end_array register used to indicate said memory cell location logically sequential and adjacent to the last cell location written;

set a read_address register to start_array, wherein said read address register indicates a read address;

set a write_address register and said start_array register to [[(end_array+(M−1)) div M]modulo N]*M, wherein said write address register indicates a write address; and repeat the following sequence for each said data file stored within said data storage array:

select a data file located at the read_address;

determine if said selected file is active; and repeat the following sequence for every cell location within said selected file:

if said selected file is active, copy data from the location indicated by said read_address to the location indicated by said write address;

increment said read_address register and said write_address register;

determine if said read_address crossed a sector boundary during said incrementing; and if said read_address crossed a sector boundary from a previous sector, erase said previous sector; and unless said read_address indicates the first location of one of said sectors, erase the sector indicated by said read_address.

* * * * *

UNITED STATES PATENT AND TRADEMARK OFFICE
CERTIFICATE OF CORRECTION

PATENT NO. : 5,896,393

DATED : April 20, 1999

INVENTOR(S) : Simplified File Management Scheme for Flash Memory

It is certified that error appears in the above-identified patent and that said Letters Patent is hereby corrected as shown below:

Claim 5, col. 9, line 67, please delete "end array" and insert --end_array-- in place thereof.

Claim 5, col. 10, line 8, please delete "end array register to said write address" and insert --end_array register to said write_address-- in place thereof.

Signed and Sealed this

Eighth Day of February, 2000

Attest:

Q. TODD DICKINSON

Attesting Officer

Commissioner of Patents and Trademarks